United States Patent [19]

Brown et al.

[11] Patent Number: 4,977,029

[45] Date of Patent: Dec. 11, 1990

[54] TINTABLE COATINGS FOR GLASS OPHTHALMIC LENSES

[75] Inventors: Jacqueline L. Brown, Corning; Stephen E. Howe, Pine City; Sheryl L. Hultman, Corning, all of N.Y.

[73] Assignee: Corning Incorporated, Corning, N.Y.

[21] Appl. No.: 215,384

[22] Filed: Jul. 5, 1988

[51] Int. Cl.$^5$ .................. B32B 17/06; B32B 9/04; G02C 7/02; G02C 7/10

[52] U.S. Cl. .................. 428/429; 428/447; 351/163; 351/166

[58] Field of Search ............... 351/163, 166; 428/429, 428/447

[56] References Cited

U.S. PATENT DOCUMENTS 4,355,135 10/1982 January .................. 351/160
4,547,397 10/1985 Burzynski .................. 351/166
4,800,122 1/1989 Sallavanti .................. 428/447

*Primary Examiner*—Merrell C. Cashion, Jr.
*Assistant Examiner*—Amy Hulina
*Attorney, Agent, or Firm*—Clinton S. Janes, Jr.

[57] ABSTRACT

This invention relates to coatings for application to glass lenses to provide a tint thereto. The coatings at a thickness of no more than 10 microns in conjunction with organic dyes conventionally used to tint organic plastic lenses will impart a visible transmission of less than 50%, preferably less than 30%. The coatings consist essentially of an alkyl siloxane containing a dipolar silane selected from the group consisting of an ester-functional silane, a hydroxy-functional silane, amino-functional silane, a carboxylic acid-functional silane, and a halide form of those silanes.

3 Claims, No Drawings

TINTABLE COATINGS FOR GLASS OPHTHALMIC LENSES

BACKGROUND OF THE INVENTION

A major marketing advantage which plastic ophthalmic lenses currently enjoy over glass lenses is the capability of accepting, on their surfaces in the finished state, organic tints exhibiting a wide range of colors. That is, purchasers of plastic lenses have the option of selecting lenses custom tinted in a substantially infinite spectrum of colors and styles, and those lenses can be readily surface tinted by the eyeglass dispenser, e.g., by an optician, optometrist, or ophthalmologist, in his office or laboratory within a relatively short time. As an apparent corollary to that situation, the ready capability of surface tinting plastic lenses provides the eyeglass dispenser with the opportunity to add value to a finished lens with minimal cost and effort.

Numerous attempts have been made to apply surface tints to glass lenses utilizing organic dyes operable with plastic lenses. Unfortunately, those efforts to date have not provided tints of acceptable visible transmissions, i.e., less than 50% and, preferably, less than 30% transmission, where the coatings also satisfied five other practical requirements. Hence, the basic requisites for a tintable coating comprise: (1) it must be tintable with dyes operable with CR-39 plastic, CR-39 is a registered trademark of PPG Industries, Pittsburgh, Penna., referring to [poly(diallyl diglycol carbonate)], the material most commonly used commercially in the production of ophthalmic lenses, inasmuch as the eyeglass dispenser does not wish to stock two different sets of dyes; (2) it must demonstrate resistance to abrasion superior to that exhibited by CR-39 plastic; (3) it must be sufficiently adherent to glass to withstand boiling water to which it is exposed during the tinting operation, and to withstand surface abuse and environmental stresses encountered in normal wear; (4) it must be optically clear, i.e, essentially free from haze and other visual defects; and, from a practical point of view, (5) it must be relatively easy and inexpensive to apply. Coatings operable on glass surfaces would impart to glass lenses such capabilities as fashion tints, gradient tints, sunglass tints, and ultraviolet radiation blocking tints.

As was observed above, the search for a tintable polymer coating for use with glass ophthalmic lenses has been ongoing for a number of years. Various melamine, alkyd, and polyester resins have been investigated, some of which demonstrated greater affinity for CR-39 dyes than CR-39 itself. Unfortunately, those resins exhibited a lower resistance to abrasion than CR-39 and, hence, were deemed unacceptable on that score.

Based upon that previous work, we focussed our experimentation on resins which are acknowledged to manifest high abrasion resistance. Such resins fall into two general classes, viz., silicones and polyurethanes. Silicones employed as abrasion-resistant coatings typically consist of highly crosslinked alkyl siloxanes reinforced with colloidal silica copolymerized into the matrix. Thus, abrasion resistance is derived from a combination comprising a very rigid matrix and a hard filler. Two mechanisms are available in polyurethanes to impart scratch resistance. The first group generally relies on toughness. Those materials are also highly crosslinked and can be either air or moisture cured. The second group is composed of lightly crosslinked urethanes which exhibit cold-flow characteristics. The latter confer self-healing capabilities to the resin so that, although the resin can be scratched fairly easily, the scratches become less noticeable with time.

Several resins from each class were screened for chemical durability, hardness, and tintability. Chemical durability was evaluated as a set of pass/fail tests by exposing the coating to boiling water and to several such common household chemicals as acetone, isopropanol, and liquid detergent for about 30 minutes. Hardness was evaluated employing a pencil hardness method following Dow Corning Corporate Test Method CTM-0214. Tintability was evaluated qualitatively after immersion in BPI blue tint CR-39 dye for about five minutes at 95° C. Those tests demonstrated the substantial superiority of silicones with respect to chemical durability and hardness, but they were somewhat inferior to the polyurethanes with respect to tintability. Because it was not believed that the chemical durability and hardness of a polyurethane could be improved to match that of the silicones, we sought means to enhance the tinting capability of the silicones.

Various silicone resins are currently employed commercially as scratch resistant coatings for plastic (CR-39) lenses. Unfortunately, when applied to glass surfaces, those coatings do not tint to acceptable levels with dyes operable with CR-39 plastic. The above-described screening tests indicated that the tinting capacity of the coating was actually much less than that of CR-39. Accordingly, it was conjectured that the acceptable tinting of the CR-39 lens was the result of the dye passing through the silicone and impregnating the CR-39 plastic. Because no like mechanism exists between the dye and glass, the level of tinting of glass lenses was insufficient.

Because silicone resins provide the other physical and chemical characteristics desired in coatings for ophthalmic lenses, the primary objective of the present invention was to develop means for improving the tintability of those resins by dyes operable with CR-39 plastics such as to render them acceptable for tinting glass lenses.

SUMMARY OF THE INVENTION

The tintability of CR-39 [poly(diallyl diglycol carbonate)] results from the dipolar attraction between the carbonate (O—CO—O) carbonyl groups of the polymer and the solubilizing groups, e.g., hydroxyl or sulfonic acid species, of the azo or anthraquinone dyes which constitute the active part of the tinting solutions.

SILVUE 339 is a registered trademark referring to a cross linked, alkyl silicone resin containing colloidal silica prepared by Dow Corning Corporation, Midland, Mich., under U.S. Pat. No. 4,355,135, which is marketed in the form of a tintable, abrasion resistant coating for plastic lenses by SDC Corporation, Garden Grove, Calif. Nevertheless, as was observed above, when alkyl siloxane coatings, of which SILVUE 339 is representative, are applied to glass surfaces, the tinting resulting is not acceptable. Hence, visible transmissions no lower than about 60% are produced.

Infrared spectral analyses of SILVUE 339 illustrated that carbonyl groups are present therein, the groups being ester carbonyls rather than the carbonate carbonyls found in CR-39. After curing of the silicone resin for two hours at 100° C., the infrared spectrum manifested a decrease in the concentration of carbonyl groups, when compared with the spectrum produced by the resin when merely dried at room temperature.

It was theorized that the tintability of SILVUE 339 and an increase in its effective lifetime relative to the extent of resin cure could be achieved by incorporating more polar groups into the structure. To investigate this theory, we worked primarily with silanes containing dipolar groups, such as ester and hydroxyl units, inasmuch as we conjectured that they would interact with the azo or anthraquinone group of the dye in like manner to that demonstrated by the carbonate groups of CR-39. Silanes containing salt groups were also examined.

We found that the addition of about 5-10% by volume of a variety of dipolar silanes to SILVUE 339 enabled it to be tinted with a commercial neutral gray dye to a visible transmission of about 30% and below when applied as a coating to a glass lens at a thickness not exceeding about 10 microns. Thus, dipolar silanes selected from the group consisting of ester-functional silanes, amino-functional silanes, hydroxy-functional silanes, carboxylic acid-functional silanes, and halide forms of those silanes have been found to be operable.

Where desired, thicker individual layers can be formed or multiple layers applied with consequent lower transmissions being derived. Such practices, however, add cost and hazard the production of nonuniform coatings, and, therefore, will only be employed where very low visible transmissions are demanded. In general, visible transmissions in the vicinity of 30% have found favor with purchasers of plastic lenses, which transmissions can normally be achieved with coating thicknesses between about 4-7 microns. Accordingly, coatings of those thicknesses have comprised the preferred practice of our invention.

Therefore, our invention provides coatings for glass articles that can be tinted to a visible transmission less than 50%, preferably less than 30%, with dyes operable with CR-39 plastic, which coatings demonstrate resistance to abrasion superior to that exhibited by CR-39 plastic, which are sufficiently adherent to glass to withstand boiling water and to withstand normal surface abuse and environmental stresses, and which are optically clear, by incorporating an effective amount of a dipolar silane selected from the group consisting of an ester-functional silane, an amino-functional silane, a hydroxy-functional silane, a carboxylic acid-functional silane, and a halide form of those silanes into an alkyl siloxane resin. Whereas even a minuscule addition of the dipolar silane will exert some effect, in order to assure tinting to yield a visible transmission below 50%, a minimum of about 2% by volume has been found suitable. Additions in amounts greater than about 20% by volume can be incorporated, but with no significant effect upon the tinting capacity of the alkyl silicone resin, and may exert a deleterious effect upon the abrasion resistance of the resin. Hence, additions at levels between about 5-10% by volume generally assure tinting transmissions of about 30% and below, and, therefore, are preferred.

DESCRIPTION OF PREFERRED EMBODIMENTS

The silanes investigated were used as received from Petrarch Systems, Inc., Bristol, Penna., and, unless specified otherwise, were cured according to the manufacturer's suggested procedure. The alkoxy silanes were used as supplied. The chlorosilanes, however, were first converted to ethoxy silanes by diluting to 10% by volume in pure ethanol and warming on a hot plate to about 40° C. for about one hour. The solutions were thereafter neutralized with $NH_4OH$ to a pH of 7.0.

Tinting was carried out using BPI CR-39 dye solutions heated to between 95°-100° C. Transmission values of the tinted lenses were measured using a Hoya spectrophotometer.

Coatings were applied to watch glasses or white crown lenses using such coating methods as dipping, spraying, and inverted spin coating, the last method being widely employed by commercial optical laboratories for coating the concave faces of plastic lenses an constituting our preferred means, because, by holding the concave face of the lens down, dust accumulation is greatly reduced. Samples for abrasion testing, however, were prepared by spin coating the convex face of the lens.

Tinting of the samples utilizing spin coating involved three general steps:

(a) careful cleaning of the lens;
(b) application of the resin; and then
(c) application of the tint.

The above steps were carried out in the laboratory in the manner described below:

(a) The lens was cleaned thoroughly with detergent in warm tap water. The lens was then rinsed well, first in tap water and then with de-ionized water, and thereafter dried in the ambient environment.

(b) After assuring the absence of dust particles thereon, 1-1.5 ml of resin was applied to the surface of the lens, the entire surface thereof being coated by swirling the solution around the edges. The excess resin was drained off and the lens spun to achieve a coating of uniform thickness across the area of the lens. After resting for about 1-2 minutes, the lens was oven dried at about 120° C. for about 10-20 minutes to promote curing of the resin. That procedure was repeated to produce a coating having a thickness in the vicinity of five microns.

(c) The tinting dye solution was heated to about 95°-100° C. and the coated lens immersed therein for about 1-5 minutes The lens was thereafter removed from the solution, rinsed with tap water, and patted dry with a soft cloth. Finally, the tinted coating was subjected to a post cure treatment at 120° C. for about 1-2 hours.

The following table records a group of silanes containing dipolar groups and their effect on the tinting capability of SILVUE 339 when applied to white crown lenses. In each instance a silane concentration of 5% by volume was utilized, with tinting being carried out through immersion for one minute in BPI gray tint CR-39 dye solution operating at 100° C. after the second coating of silane had been spun onto the concave face of an ophthalmic lens and cured for 20 minutes at 120° C. A qualitative evaluation of the effect on abrasion resistance imparted by the silane addition is also reported. In the table a + indicates improvement, a 0 indicates relatively no effect, and a — indicates deterioration. Finally, the following abbreviations are used in the table:

TABLE

| Silane | Tintability | Abrasion Resistance | Comments |
|---|---|---|---|
| BHOEAPTEO | + | 0 | |
| CMOETC | + | + | |

TABLE-continued

| Silane | Tinta-bility | Abrasion Resistance | Comments |
| --- | --- | --- | --- |
| TEOSPEC | + | − | Less brittle than Silvue 339 |
| MOPTC (acidic) | + | 0 | Color changed when exposed to an aqueous salt solution |
| MOPTMO | + | − | Abrasion resistance still superior to CR-39 |
| ODDMOSPAC | ++ | Unable to test | Second coating blistered and wrinkled first layer when applied |
| TCSEP | + | Unable to test | Second coating wrinkled when applied |
| TMOSPTMAC | ++ | Unable to test | Coating delaminated during tinting |

BHOEAPTEO Bis(2-hydroxyethyl)aminopropyltriethoxysilane
CMOETC 2-(Carbomethoxy)ethyltrichlorosilane
TEOSPEC Triethoxysilylpropylethylcarbamate
MOPTC 3-Methacryloxypropyltrichlorosilane
MOPTMO Methacryloxypropyltrimethoxysilane
ODDMOSPAC Octadecyldimethyl[3-(trimethoxysilyl)]-propyl ammonium chloride
TCSEP 2-Trichlorosilyl-r-ethylpyridine
TMOSPTMAC N-trimethoxysilylproply-N,N,N-trimethyl ammonium chloride As can be recognized from the above table, a wide variety of dipolar silanes can be employed to enhance the tinting capability of alkyl siloxane coatings. Based upon overall performance, MOPTMO is deemed to comprise the preferred additive.

We claim:

1. A glass lens having at least one coated surface, said coating having a thickness of no more than 10 microns and tinted with an organic dye operable in tinting organic plastic lenses which imparts a visible transmission to said glass lens of less than 50%, said coating being sufficiently adherent to glass to withstand boiling water and to withstand normal surface abuse and environmental stresses, and being optically clear, said coating consisting essentially of an alkyl siloxane having ester carbonyl groups present therein and containing colloidal silica and 2-10 volume % of a dipolar silane selected from the group consisting of an ester-functional silane, an amino-functional silane, a hydroxy-functional silane, a carboxylic acid-functional silane, and a halide form of those silanes.

2. A glass lens according to claim 1 wherein said dipolar silane is present in said coating in an amount of about 5-10% by volume.

3. A glass lens according to claim 1 wherein said esterfunctional silane present in said coating is methacryloxypropyltrimethoxysilane.

* * * * *